(12) United States Patent
Liao et al.

(10) Patent No.: US 8,433,131 B2
(45) Date of Patent: Apr. 30, 2013

(54) METHOD FOR RECOGNIZING THREE-DIMENSIONAL CONTROL POINT AND COMPUTER READABLE MEDIUM USING THE SAME THEREOF

(75) Inventors: Chih-Pin Liao, Xinshi Township, Tainan County (TW); Jay Huang, Tainan (TW); Yao-Yang Tsai, Kaohsiung (TW); Ko-Shyang Wang, Kaoshiung (TW)

(73) Assignee: Industrial Technology Research Institute, Hsinchu (TW)

( * ) Notice: Subject to any disclaimer, the term of this patent is extended or adjusted under 35 U.S.C. 154(b) by 347 days.

(21) Appl. No.: 12/838,710

(22) Filed: Jul. 19, 2010

(65) Prior Publication Data

US 2011/0317925 A1    Dec. 29, 2011

(30) Foreign Application Priority Data

Jun. 23, 2010    (TW) ................................ 99120495 A (51) Int. Cl.
*G06K 9/00*    (2006.01)
(52) U.S. Cl.
USPC .......................................... 382/154; 382/106
(58) Field of Classification Search .................. 382/154
See application file for complete search history.

(56) References Cited

U.S. PATENT DOCUMENTS

| 5,734,743 | A | * | 3/1998 | Matsugu et al. | ............. | 382/154 |
| 6,434,255 | B1 | | 8/2002 | Harakawa | | |
| 7,227,526 | B2 | | 6/2007 | Hildreth et al. | | |
| 7,289,658 | B2 | * | 10/2007 | Allen et al. | ................... | 382/144 |
| 7,317,836 | B2 | | 1/2008 | Fujimura et al. | | |
| 2008/0120577 | A1 | | 5/2008 | Ma et al. | | |
| 2009/0285283 | A1 | * | 11/2009 | Gao et al. | ................ | 375/240.08 |
| 2010/0284606 | A1 | * | 11/2010 | Kao | ............................. | 382/154 |

FOREIGN PATENT DOCUMENTS

| JP | 07-334299 | 12/1995 |
| JP | 2004-246856 | 9/2004 |
| JP | 4218963 | 11/2004 |
| JP | 2006-099749 | 4/2006 |

OTHER PUBLICATIONS

Japanese language office action dated Jun. 5, 2012 and its English language translation.
English language translation of abstract of JP 07-334299 (published Dec. 22, 1995).

(Continued)

*Primary Examiner* — Alex Liew
(74) *Attorney, Agent, or Firm* — McClure, Qualey & Rodack, LLP (57) ABSTRACT

A method for recognizing three-dimensional control points and a computer readable medium using the same are disclosed. The method for recognizing three-dimensional control points comprises the following steps. A depth information item corresponding to an image captured by an image capturing apparatus is received. A three-dimensional block information item corresponding to a three-dimensional block is generated according to the depth information. At least one reference plane is generated according to the depth information. At least one connection group is generated according to the three-dimensional block information and the reference plane. A three-dimensional block nearest to the image capturing apparatus is selected as a control point from the connection group.

20 Claims, 8 Drawing Sheets

OTHER PUBLICATIONS

English language translation of abstract of JP 2004-246856 (published Sep. 2, 2004).
English language translation of abstract of JP 4218963 (published Nov. 25, 2004).
English language translation of abstract of JP 2006-099749 (published Apr. 13, 2006).
TW Office Action dated Feb. 17, 2013.

* cited by examiner

METHOD FOR RECOGNIZING THREE-DIMENSIONAL CONTROL POINT AND COMPUTER READABLE MEDIUM USING THE SAME THEREOF

This application claims the benefit of Taiwan application Serial No. 99120495, filed Jun. 23, 2010, the subject matter of which is incorporated herein by reference.

BACKGROUND OF THE DISCLOSURE

1. Field of the Disclosure

The disclosure relates in general to an apparatus of a method for recognizing control point, and more particularly to a method for recognizing three-dimensional control points and a computer readable medium using the same.

2. Description of the Related Art

Multi-touch is a very convenient function provided by touch screen interface. The spirit of multi-touch enables people to operate the system in a manner more adapted to people's habits of movements, further improving man-machine interaction. According to the first generally known technology, firstly, the object features, such as the color, the shape and the pattern of a fist, are defined. Next, an image is fetched. Then, the object features are compared to the feature blocks of the image to define a control point. According to a second generally known technology, the depth feature is further used to filter the background to avoid the complicated background resulting in misjudgment. According to a third generally known technology, a three-dimensional control region is located, and a control point nearest to the camera is located from the three-dimensional control region according to the depth information and the hand feature.

SUMMARY OF THE DISCLOSURE

The disclosure is directed to a method for recognizing three-dimensional control points and a computer readable medium using the same.

According to a first aspect of the present disclosure, a method for recognizing three-dimensional control points is disclosed. The method for recognizing three-dimensional control points comprises the following steps. A depth information item corresponding to an image captured by an image capturing apparatus is received. A three-dimensional block information item corresponding to a three-dimensional block is generated according to the depth information. At least one reference plane is generated according to the depth information. At least one connection group is generated according to the three-dimensional block information and the reference plane. The three-dimensional block nearest to the image capturing apparatus is selected as a control point from the connection group.

According to a second aspect of the present disclosure, a computer-readable medium is disclosed. The computer-readable medium has a plurality of program commands for performing a method for recognizing three-dimensional control points. The method for recognizing three-dimensional control points comprises the following steps. A depth information item corresponding to an image captured by an image capturing apparatus is received. A three-dimensional block information item corresponding to three-dimensional block is generated according to the depth information. At least one reference plane is generated according to the depth information. At least one connection group is generated according to the three-dimensional block information and the reference plane. The three-dimensional block nearest to the image capturing apparatus is selected as a control point from the connection group.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

A method for recognizing three-dimensional control points and a computer readable medium using the same are disclosed in the following embodiments for correctly recognizing control points. The computer-readable medium has a plurality of program commands for performing a method for recognizing three-dimensional control points. The method for recognizing three-dimensional control points comprises the following steps. A depth information item corresponding to an image captured by an image capturing apparatus is received. A three-dimensional block information item corresponding to three-dimensional block is generated according to the depth information. At least one reference plane is generated according to the depth information. At least one connection group is generated according to the three-dimensional block information and the reference plane. The three-dimensional block nearest to the image capturing apparatus is selected as a control point from the connection group.

Figure 1:
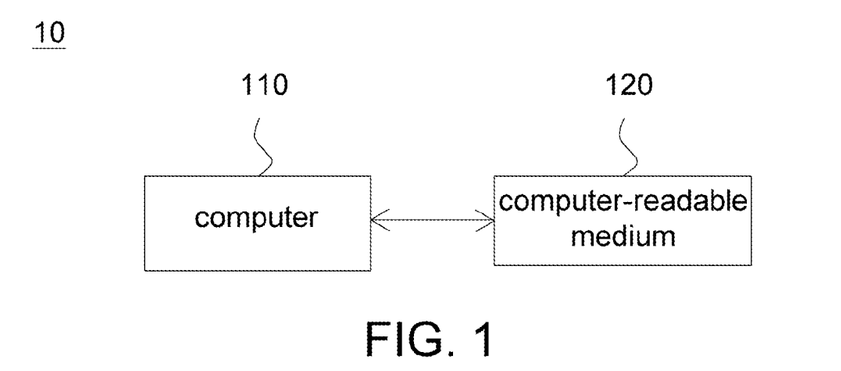
FIG. 1 shows a system for recognizing three-dimensional control points.
Figure 2:
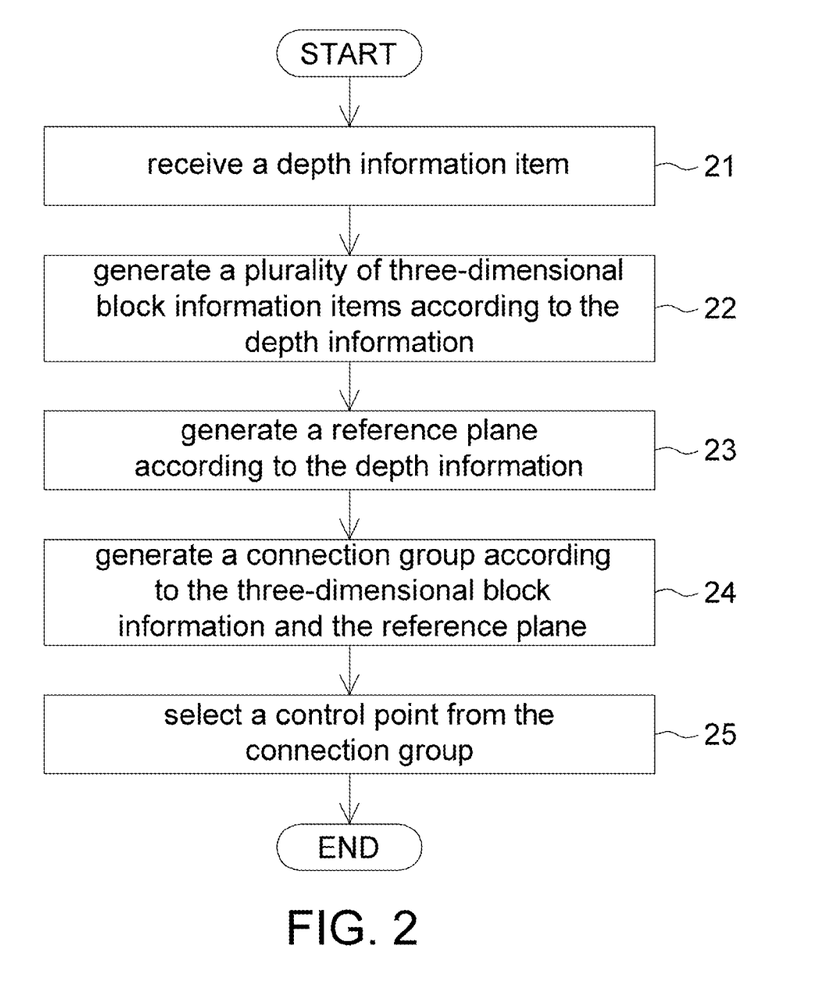
FIG. 2 shows a flowchart of a method for recognizing three-dimensional control points.

Method for Recognizing Three-Dimensional Control Points and Computer-Readable Medium:

Referring to FIG. 1 and FIG. 2. FIG. 1 shows a system for recognizing three-dimensional control points. FIG. 2 shows a flowchart of a method for recognizing three-dimensional control points. The system for recognizing three-dimensional control points 10 comprises a computer 110 and a computer-readable medium 120. The computer-readable medium 120 has a plurality of program commands for loading a method for recognizing three-dimensional control points to the computer 110. Examples of the computer-readable medium 120 include magnetic disc, optical disc, magnetic tape or hard drive. The method for recognizing three-dimensional control points comprises the following steps. Firstly, the method begins at step 21, a depth information item corresponding to an image captured by an image capturing apparatus such as an infra-red camera or a dual camera is received.

Next, the method proceeds to step 22, a three-dimensional block information item corresponding to a three-dimensional block is generated according to the depth information. Then, the method proceeds to step 23, at least one reference plane is generated according to the depth information. After that, the method proceeds to step 24, at least one connection group is generated according to the three-dimensional block information and the reference plane. Lastly, the method proceeds to step 25, a three-dimensional block nearest to the image capturing apparatus is selected as a control point from the connection group. The steps of generating the three-dimensional block information, the reference plane and connection group are respectively disclosed below.

Figure 3:
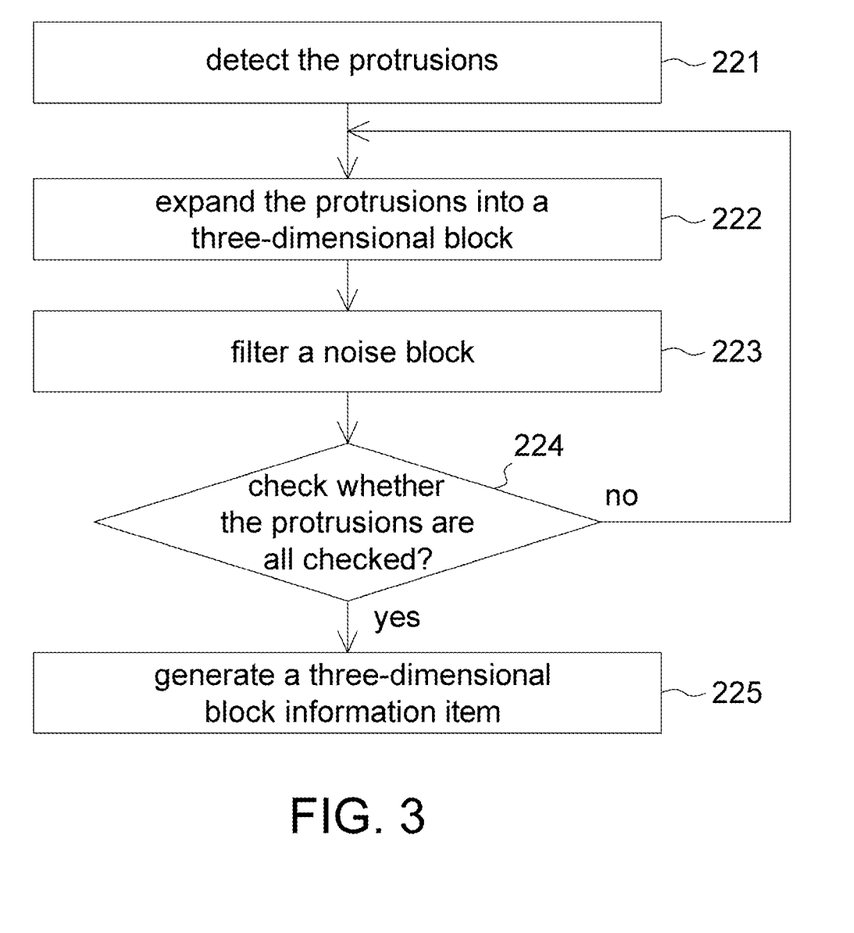
FIG. 3 shows a detailed flowchart of generating three-dimensional block information item.
Figure 4:
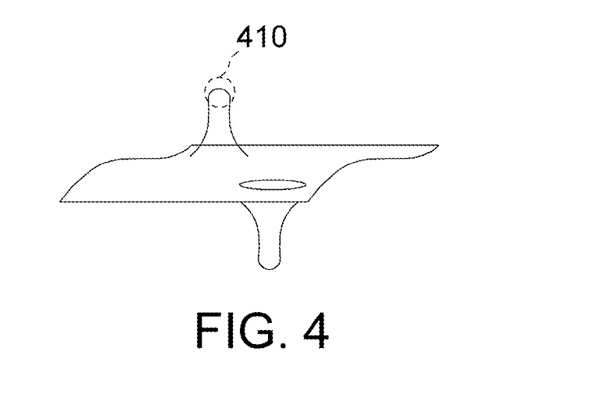
FIG. 4 shows a protrusion.
Figure 5:
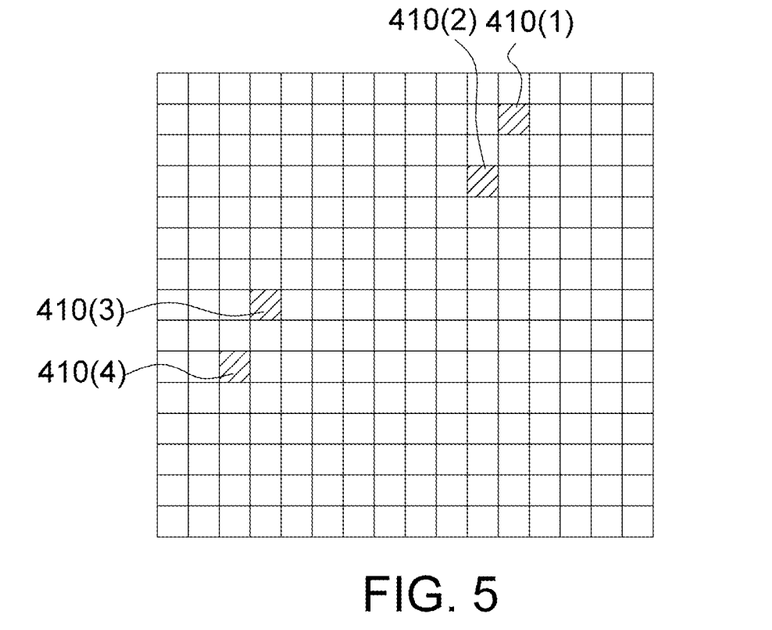
FIG. 5 shows the state before the noise block is filtered.
Figure 6:
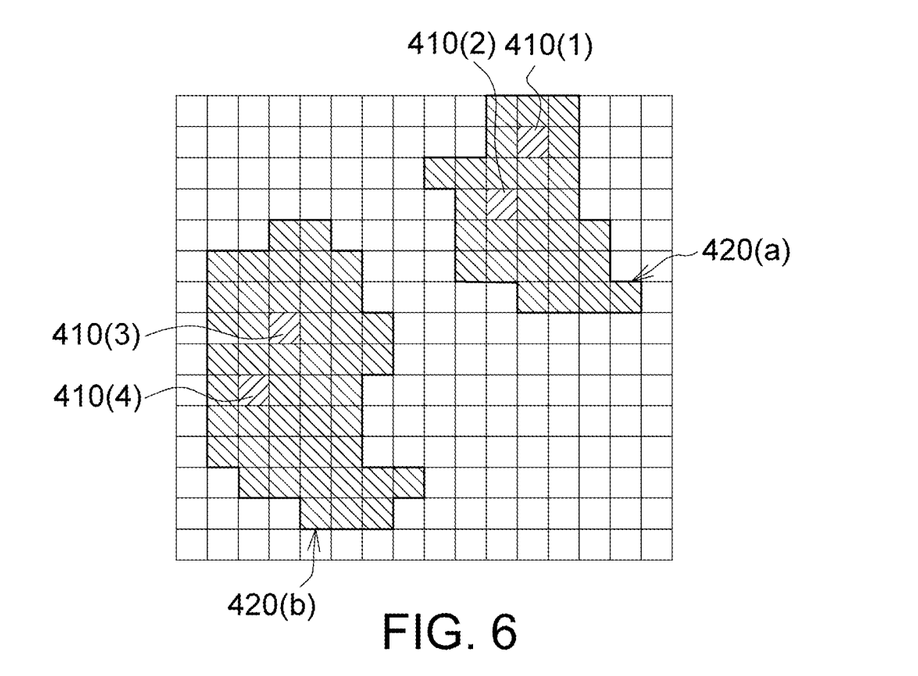
FIG. 6 shows the state after the noise block is filtered.
Figure 7:
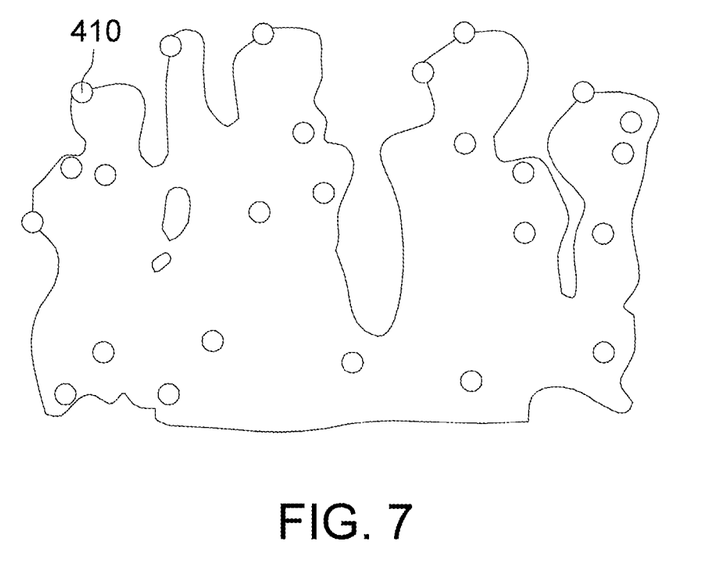
FIG. 7 shows all protrusions in an image.
Figure 8:
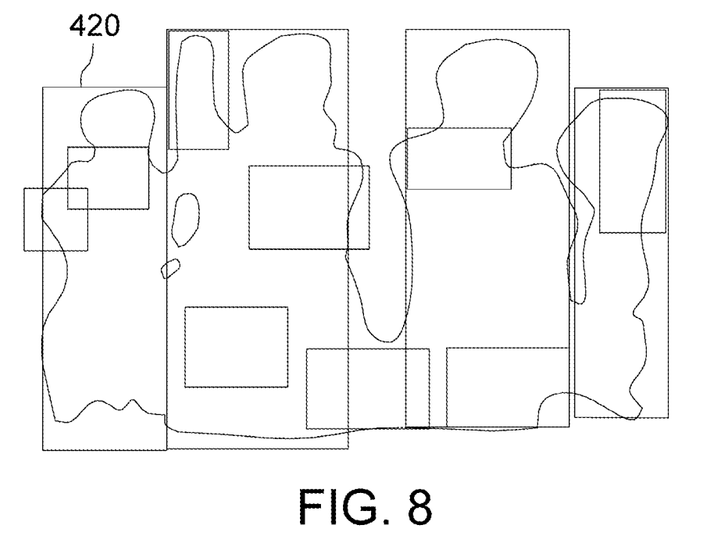
FIG. 8 shows all three-dimensional blocks in an image.

Generation of a Three-Dimensional Block Information Item:

Referring to FIG. 3~FIG. 8. FIG. 3 shows a detailed flowchart of generating three-dimensional block information item. FIG. 4 shows a protrusion. FIG. 5 shows the state before the noise block is filtered. FIG. 6 shows the state after the noise block is filtered. FIG. 7 shows all protrusions in an image. FIG. 8 shows all three-dimensional blocks in an image. Step 22 further comprises sub-steps 221~225.

Firstly, step 22 begins at sub-step 221, the protrusions 410 of an image captured by an image capturing apparatus are detected according to the depth information along horizontal and vertical direction. A protrusion 410 refers to a characteristic pixel (as illustrated in FIG. 4), which exists in an image and is projected for a certain height with respect to its surrounding pixels.

Next, step 22 proceeds to sub-step 222, the protrusion 410 of FIG. 7 is expanded into the three-dimensional block 420 of FIG. 8 according to the depth differences between the protrusion 410 and its surrounding pixels. In sub-step 222, the depth information of the pixels surrounding the protrusion 410 is checked. The pixels surrounding the protrusion 410 are included in the expansion range if the depth difference between the protrusion 410 and its surrounding pixels is within a predetermined range. Thus, the protrusion 410 is expanded into a three-dimensional block 420.

Then, step 22 proceeds to sub-step 223, a noise block is filtered off the three-dimensional block 420 according to the depth change. It is noted, sub-steps 223 and 222 can be performed at the same time. For example, when the protrusion 410(1) of FIG. 5 expands, the expansion touches another protrusion 410(2). Meanwhile, in sub-step 223, the depth information of the protrusion 410(2) is compared to that of the protrusion 410(1). If the depth difference of the protrusion 410(2) is within a predetermined range, the protrusion 410(2) is included in the expansion range of protrusion 410(1), the expansion authority of the protrusion 410(2) (as illustrated in FIG. 6) is lifted, and the protrusion 410(1) is expanded into a three-dimensional block 420(a). Likewise, if the depth difference of the protrusion 410(4) is within a predetermined range, the protrusion 410(4) is included into the expansion range of the protrusion 410(3), the expansion authority of the protrusion 410(4) is lifted, and the protrusion 410(3) is expanded into a three-dimensional block 420(b). Thus, the computing iteration of the sub-step 222 can be reduced, and the computing speed can be increased without affecting the accuracy.

After that, step 22 proceeds to sub-step 224, whether the protrusions 410 of an image are all checked is determine. If not all protrusions 410 of an image are checked, then the sub-steps 222 and 223 are repeated. However, the protrusions (such as the protrusion 410(2) and the protrusion 410(4) illustrated in FIG. 5 and FIG. 6 respectively) whose expansion authority is lifted in sub-step 223 will not be included in computation. In sub-step 224, the checking will be repeated until the protrusions 410 detected in sub-step 221 are all checked.

Next, step 22 proceeds to sub-step 225, a three-dimensional block information item corresponding to three-dimensional block 420 is generated. Furthermore, after all three-dimensional blocks 420 are determined in sub-step 224, a representative point is located from the three-dimensional blocks 420 first, wherein the representative point is such as the gravity point of the three-dimensional blocks 420. After the representative point of the three-dimensional blocks 420 is located, a three-dimensional block information item corresponding to the representative point is generated.

Figure 9:
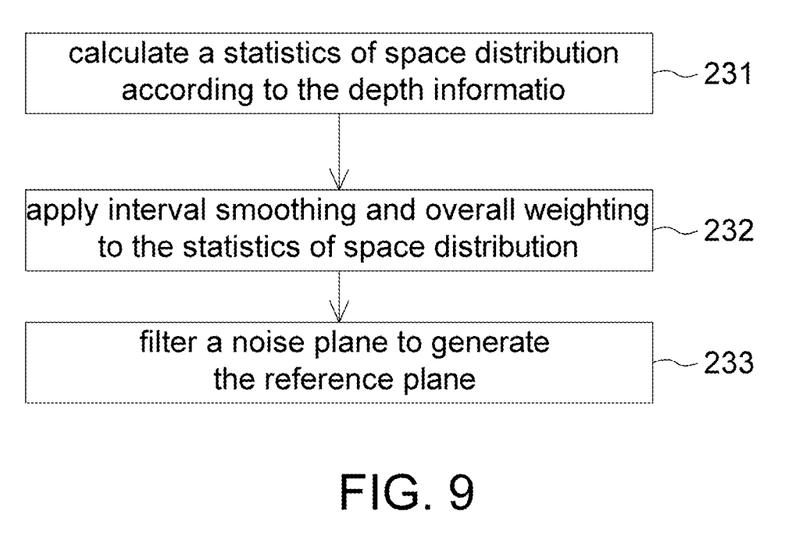
FIG. 9 shows a detailed flowchart of generating a reference plane.
Figure 10:
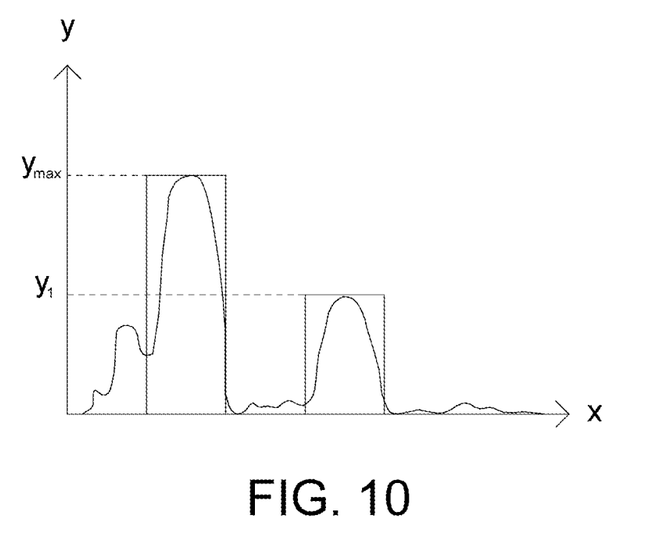
FIG. 10 shows statistics of space distribution.

Generation of Reference Plane:

Referring to FIG. 9~FIG. 10. FIG. 9 shows a detailed flowchart of generating a reference plane. FIG. 10 shows statistics of space distribution. Step 23 further comprises sub-steps 231~233. Firstly, step 23 begins at sub-step 231, a statistics of space distribution is calculated according to the depth information. Furthermore, in sub-step 231, the corresponding position in the three-dimensional space of each pixel of an image is evaluated with the depth information, so as to re-construct a three-dimensional scene. The statistics of space distribution of FIG. 10 can be obtained with the three-dimensional scene. In FIG. 10, the original point denotes the position of the image capturing apparatus, the x-axis denotes the distance to the image capturing apparatus, and the y-axis denotes the number of pixels. Since the x-axis denotes the distance to the image capturing apparatus, the statistics of space distribution of FIG. 10 denotes the number of pixels under different depths.

Next, step 23 proceeds to sub-step 232, interval smoothing and overall weighting are applied to the statistics of space distribution of FIG. 10. Furthermore, in order to remove the influence exercised on the statistics of space distribution by minute noises, the original statistics of space distribution is smoothed by way of fuzzification in sub-step 232 for mitigating the influence exercised by minute noises. For example, in sub-step 232, a certain range of depth segment (such as a certain range in the y-axis coordinate) is selected, and the corresponding pixels of the depth segment are added and averaged as a representative value of the depth segment. Next, the depth segment is moved step by step and the above computation is repeated, so that the subsequent computation will not be affected by the noises. Then, the statistics of overall space distribution is weighted and evaluated through the relationship with the camera distance.

Then, the step 23 proceeds to sub-step 233, the noise plane is filtered to generate a reference plane. Furthermore, in order to locate an appropriate reference plane from the statistics of space distribution of FIG. 10, in sub-step 233, the highest peak value ymax is located from the statistics of space distribution first and then the highest peak value ymax is used as a reference for evaluation. Suppose 30% of the highest peak value ymax is used as a basis of determination. The pixel value of a peak value not exceeding the reference value will not be selected as an appropriate reference plane, and will be determined as a noise plane to be filtered off. After the filtering computation, it is found that y1 of the statistics of space distribution of FIG. 10 is conformed to the requirement. In sub-step 233, the highest peak value ymax and the peak value y1 are used as reference, and the space pixel distribution of the x-axis within the peak value region is analyzed and further divided into the reference planes with similar depth for different users.

Figure 11:
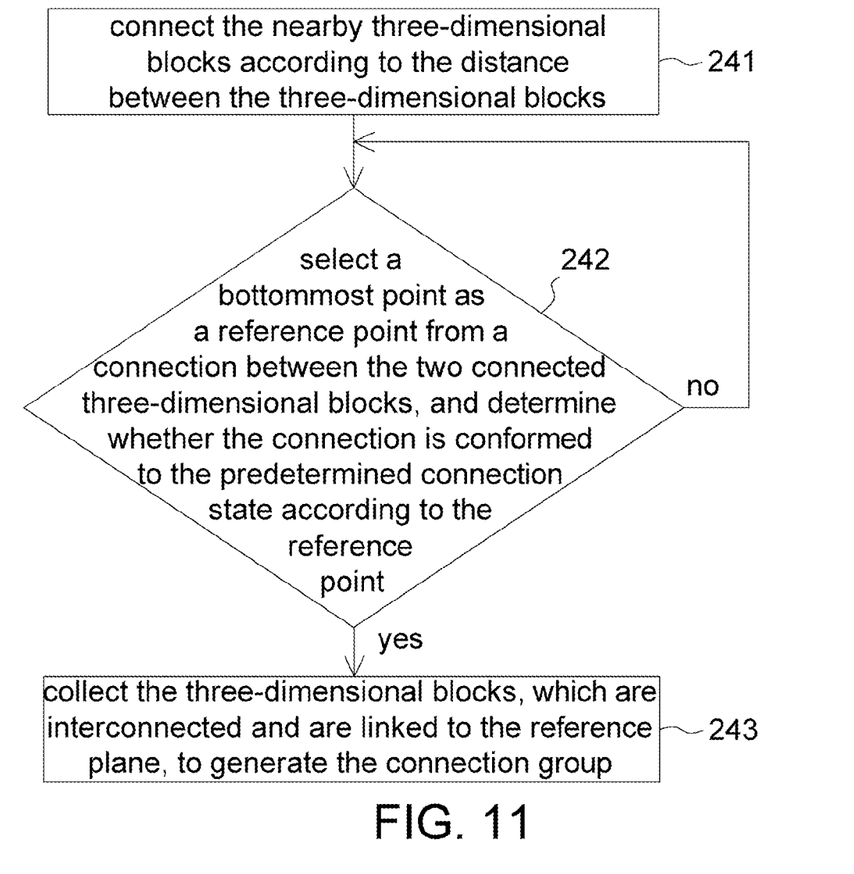
FIG. 11 shows a detailed flowchart of generating a connection group.
Figure 12:
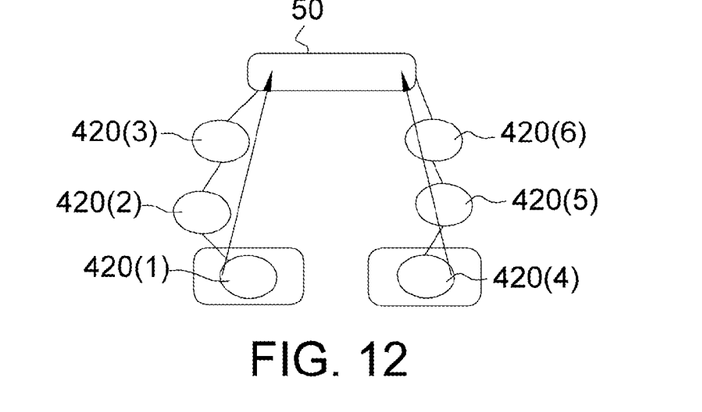
FIG. 12 shows the result of a first connection type of three-dimensional blocks.
Figure 13:
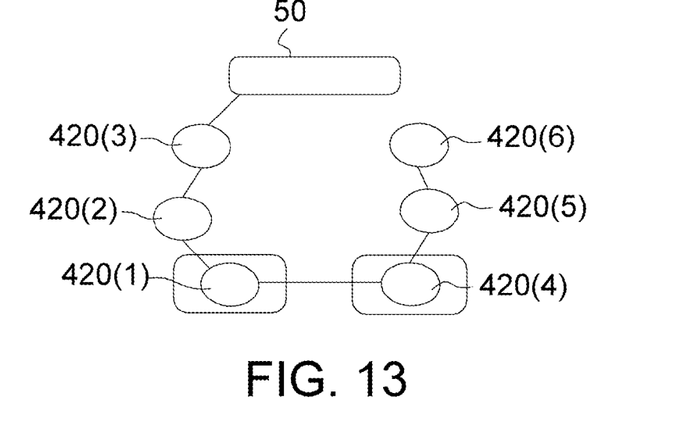
FIG. 13 shows the result of a second connection type of three-dimensional blocks.
Figure 14:
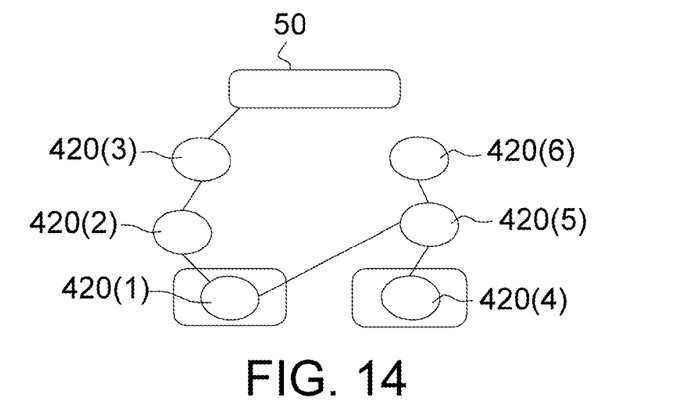
FIG. 14 shows the result of a third connection type of three-dimensional blocks.
Figure 15:
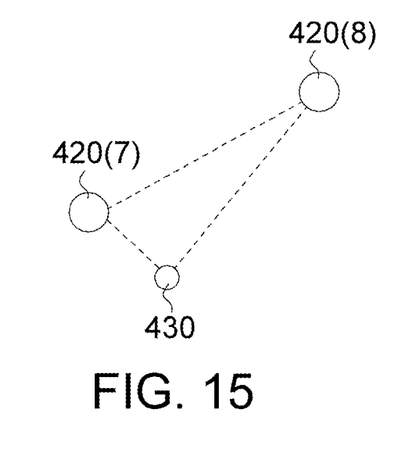
FIG. 15 shows a reference point being determined from the connection between two three-dimensional blocks.
Figure 16:
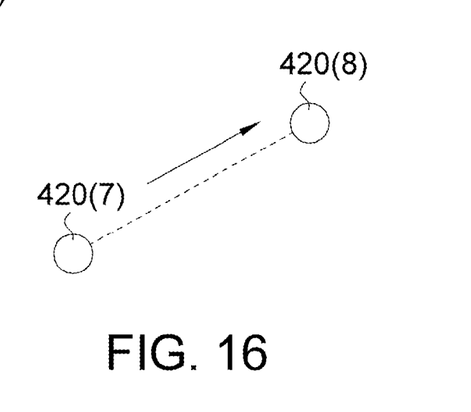
FIG. 16 shows a first type of three-dimensional blocks.
Figure 17:
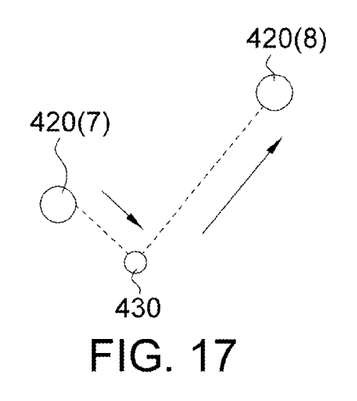
FIG. 17 shows a second type of three-dimensional blocks.
Figure 18:
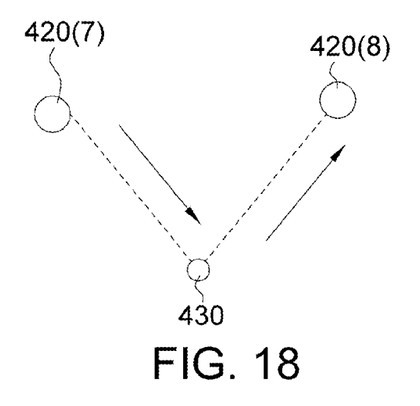
FIG. 18 shows a third type of three-dimensional blocks.
Figure 19:
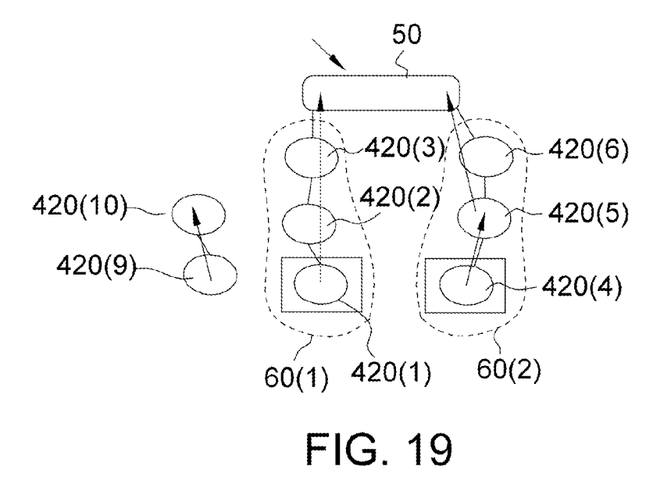
FIG. 19 shows examples of connection groups.

Generation of Connection Groups:

Referring to FIG. 11~FIG. 19. FIG. 11 shows a detailed flowchart of generating a connection group. FIG. 12 shows the result of a first connection type of three-dimensional blocks. FIG. 13 shows the result of a second connection type of three-dimensional blocks. FIG. 14 shows the result of a third connection type of three-dimensional blocks. FIG. 15 shows a reference point being determined from the connection between two three-dimensional blocks. FIG. 16 shows a first type of three-dimensional block. FIG. 17 shows a second type of three-dimensional blocks. FIG. 18 shows a third type of three-dimensional blocks. FIG. 19 shows examples of connection groups. In step 24, after the three-dimensional block information and the three-dimensional block information are generated, the connection between the three-dimensional blocks is analyzed according to the three-dimensional block information and the reference plane, and the connection groups are generated according to the connection between the three-dimensional blocks. Step 24 further comprises sub-steps 241~243.

Firstly, step 24 begins at sub-step 241, the nearby three-dimensional blocks are connected according to the distance between the three-dimensional blocks. Furthermore, in step 241, similar three-dimensional blocks are connected together according to the distance between the three-dimensional blocks, and the distance between the three-dimensional blocks can be calculated according to Euclidean distance. In general, the correct connection direction of the three-dimensional blocks 420(1)~420(3) should be directed towards the reference plane 50 as illustrated in FIG. 12, and the correct connection direction of the three-dimensional blocks 420(4)~420(6) should also be directed towards the reference plane 50 as illustrated in FIG. 12. However, if the determination of whether two three-dimensional blocks are connected is merely based on Euclidean distance, then erroneous connection as illustrated in FIG. 13 or FIG. 14 may occur. To avoid the occurrence of erroneous connection, after the nearest three-dimensional block is located according to Euclidean distance in sub-step 241, the determination of whether the connection between the three-dimensional blocks is correct is checked in the subsequent sub-step 242. If the connection between the three-dimensional blocks does not pass the check in sub-step 242, then step 24 returns to sub-step 241, the second nearest three-dimensional block is located, and the determination of whether the connection between the three-dimensional blocks is correct is checked again as in sub-step 242.

Next, the method proceeds to sub-step 242, a bottommost point is selected as a reference point 430 from the connection between two connected three-dimensional blocks, and the determination of whether the connection is conformed to the predetermined connection state is checked according to reference point 430. If the connection is not conformed to the predetermined connection state, then sub-step 241 is repeated. Furthermore, as illustrated in FIG. 15, the depths of the points on the connection line between the three-dimensional blocks 420(7) and 420(8) are calculated, a bottommost point is located from the points on the connection line, and the bottommost point is defined as a reference point 430. If the relationship between the bottommost point and the reference point 430 is as that illustrated in FIG. 16, this implies that no reference point 430 is relative low on the connection line between the three-dimensional blocks 420(7) and 420(8). Such connection is directed towards the reference plane along the hand, so the connection between the three-dimensional blocks 420(7) and 420(8) as illustrated in FIG. 16 is not conformed to the predetermined connection state.

If the relationship between the bottommost point and the reference point 430 is as that illustrated in FIG. 17, this implies that despite the reference point 430 is lower than the three-dimensional blocks 420(7) and 420(8), the distance between the reference point 430 and the three-dimensional blocks 420(7) and 420(8) is still within a certain limit. In terms of overall connection, the connection direction illustrated in FIG. 17 is still directed towards the reference plane, so the connection between the three-dimensional blocks 420(7) and 420(8) as illustrated in FIG. 17 is not conformed to the predetermined connection state.

If the relationship between the bottommost point and the reference point 430 is as that illustrated in FIG. 18, this implies that the reference point 430 is far lower the than the three-dimensional block 420(7) and 420(8). If the three-dimensional blocks 420(7) and 420(8) respectively are two fingertips, and the reference point 430 is on the reference plane, the connection between the three-dimensional block 420(7) and 420(8) is by no means conformed to the predetermined connection state no matter how close to each other the three-dimensional block 420(7) and 420(8) are. Thus, the three-dimensional block 420(7) and 420(8) will not be connected. Then, step 24 returns to sub-step 241 to locate the second nearest three-dimensional block.

Likewise, no matter how close two people are, as long as there is a pitted reference point 430 existing on the connection line of the three-dimensional blocks of the fingertips, the three-dimensional blocks will not be connected together. Thus, the mutual interference of multi-point correspondence occurring when many people try to operate at the same time can be resolved, so as to assure that the connection between the three-dimensional blocks is not conformed to the predetermined connection state.

Then, step 24 proceeds to sub-step 243, the three-dimensional blocks are collected to generate a connection group, wherein the three-dimensional blocks are interconnected and are linked to the reference plane. Furthermore, as illustrated in FIG. 19, if the three-dimensional block 420(1) and 420(4) can be correctly connected to the reference plane 50, then the three-dimensional blocks 420(1) and 420(4) are logical control points. To the contrary, if the three-dimensional block 420(9) cannot be correctly connected to the reference plane 50, then the three-dimensional block 420(9) cannot be used as a logical control point, and become a noise in the space. Thus, in sub-step 243, the three-dimensional blocks 420(1)~420(3), which are interconnected and are linked to the reference plane, are collected to generate a connection group 60(1), and the three-dimensional blocks 420(4)~420(6), which are interconnected and are linked to the reference plane, are collected to generate a connection group 60(2). Then, the method proceeds to step 25, the three-dimensional block nearest to the image capturing apparatus 420(1) and 420(4) is selected as a control point from the connection groups 60(1) and 60(2).

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for recognizing three-dimensional control points, comprising:
   receiving a depth information item corresponding to an image captured by an image capturing apparatus;
   generating a plurality of three-dimensional block information items corresponding to a plurality of three-dimensional blocks according to the depth information;
   generating at least one reference plane according to the depth information;
   generating at least one connection group according to the three-dimensional block information and the reference plane; and
   selecting a three-dimensional block nearest to the image capturing apparatus as a control point from the connection group;
   wherein the step of generating a plurality of three-dimensional block information items comprises:
   detecting a plurality of protrusions according to the depth information;
   expanding the protrusions into the three-dimensional blocks according to the depth differences between the protrusions and the pixels surrounding the protrusions; and
   generating the three-dimensional block information items corresponding to the three-dimensional blocks.

2. The method for recognizing three-dimensional control points according to claim 1, wherein the step of generating a plurality of three-dimensional block information items further comprises:
   filtering noise blocks off the three-dimensional blocks according to depth change.

3. The method for recognizing three-dimensional control points according to claim 1, wherein the step of generating a plurality of three-dimensional block information items further comprises:
   determining whether the protrusions are all checked: if no, then the step of expanding the protrusions into the three-dimensional blocks is repeated.

4. The method for recognizing three-dimensional control points according to claim 1, wherein the step of generating a plurality of three-dimensional block information items further comprises:
   determining a plurality of representative points from the three-dimensional blocks; and
   generating the three-dimensional block information items corresponding to the representative points.

5. The method for recognizing three-dimensional control points according to claim 4, wherein the representative points respectively are the gravity points of the three-dimensional blocks.

6. The method for recognizing three-dimensional control points according to claim 1, wherein the step of generating at least one the reference plane comprises:
   calculating a statistics of space distribution according to the depth information;
   applying interval smoothing and overall weighting to the statistics of space distribution; and
   filtering a noise plane off to generate the reference plane.

7. The method for recognizing three-dimensional control points according to claim 6, wherein the statistics of space distribution is the number of pixels corresponding to different depths.

8. The method for recognizing three-dimensional control points according to claim 6, wherein in the step of filtering a noise plane off to generate the reference plane, the reference plane is generated according to the highest peak value of the statistics of space distribution.

9. The method for recognizing three-dimensional control points according to claim 1, wherein the step of generating at least one connection group comprises:
   connecting the nearby three-dimensional blocks according to the distance between the three-dimensional blocks;
   selecting a bottommost point as a reference point from a connection between the two connected three-dimensional blocks, and determining whether the connection is conformed to a predetermined connection state according to the reference point, and if the connection is not conformed to the predetermined connection state, then the connection step is repeated; and
   collecting the three-dimensional blocks to generate the connection group, wherein the three-dimensional blocks are interconnected and are linked to the reference plane.

10. The method for recognizing three-dimensional control points according to claim 9, wherein in the connection step, two nearest three-dimensional blocks are connected, and if the connection between the two nearest three-dimensional blocks is not conformed to the predetermined connection state, then the two second nearest three-dimensional blocks are selected.

11. A non-transitory computer-readable medium having a plurality of program commands for performing a method for recognizing three-dimensional control points, wherein the method for recognizing three-dimensional control points comprises:
   receiving a depth information item corresponding to an image captured by an image capturing apparatus;
   generating a plurality of three-dimensional block information items corresponding to a plurality of three-dimensional blocks according to the depth information;
   generating at least one reference plane according to the depth information;
   generating at least one connection group according to the three-dimensional block information and the reference plane; and
   selecting the three-dimensional block nearest to the image capturing apparatus as a control point from the connection group;
   wherein the step of generating a plurality of three-dimensional block information items comprises:
   detecting a plurality of protrusions according to the depth information;
   expanding the protrusions into the three-dimensional block according to the depth differences between the protrusions and the pixels surrounding the protrusions; and
   generating the three-dimensional block information items corresponding to the three-dimensional blocks.

12. The non-transitory computer-readable medium according to claim 11, wherein the step of generating a plurality of three-dimensional block information items further comprises:
   filtering noise blocks off the three-dimensional blocks according to depth change.

13. The non-transitory computer-readable medium according to claim 11, wherein the step of generating a plurality of three-dimensional block information items further comprises:
   determining whether the protrusions are all checked: if no, then the step of expanding the protrusions into the three-dimensional blocks is repeated.

14. The non-transitory computer-readable medium according to claim 11, wherein the step of generating a plurality of three-dimensional block information items further comprises:
   determining a plurality of representative points from the three-dimensional blocks; and
   generating the three-dimensional block information items corresponding to the representative points.

15. The non-transitory computer-readable medium, according to claim 14 wherein the representative points respectively are the gravity points of the three-dimensional blocks.

16. The non-transitory computer-readable medium according to claim 11, wherein the step of generating at least one the reference plane comprises:
   calculating a statistics of space distribution according to the depth information;
   applying interval smoothing and overall weighting to the statistics of space distribution; and
   filtering a noise plane off to generate the reference plane.

17. The non-transitory computer-readable medium according to claim 16, wherein the statistics of space distribution is the number of pixels corresponding to different depths.

18. A non-transitory computer-readable medium having a plurality of program commands for performing a method for recognizing three-dimensional control points, wherein the method for recognizing three-dimensional control points comprises:
   receiving a depth information item corresponding to an image captured by an image capturing apparatus;
   generating a plurality of three-dimensional block information items corresponding to a plurality of three-dimensional blocks according to the depth information;
   generating at least one reference plane according to the depth information;
   generating at least one connection group according to the three-dimensional block information and the reference plane; and
   selecting the three-dimensional block nearest to the image capturing apparatus as a control point from the connection group;
   calculating a statistics of space distribution according to the depth information;
   applying interval smoothing and overall weighting to the statistics of space distribution; and
   filtering a noise plane off to generate the reference plane;
   wherein in the step of filtering a noise plane off to generate the reference plane, the reference plane is generated according to the highest peak value of the statistics of space distribution.

19. The non-transitory computer-readable medium according to claim 11, wherein the step of generating at least one connection group comprises:
   connecting the nearby three-dimensional blocks according to the distance between the three-dimensional blocks;
   selecting a bottommost point as a reference point from a connection between the two connected three-dimensional blocks, and determining whether the connection is conformed to the predetermined connection state according to the reference point, and if the connection is not conformed to the predetermined connection state, then the connection step is repeated; and
   collecting the three-dimensional blocks to generate the connection group, wherein the three-dimensional blocks are interconnected and are linked to the reference plane.

20. The non-transitory computer-readable medium according to claim 19, wherein in the connection step, two nearest three-dimensional blocks are connected, and if the connection between the two nearest three-dimensional blocks is not conformed to the predetermined connection state, then the two second nearest three-dimensional blocks are selected.

* * * * *